Feb. 12, 1924.
H. G. DONIGAN
1,483,652
SCREEN FOR WINDSHIELDS
Filed Aug. 29, 1921
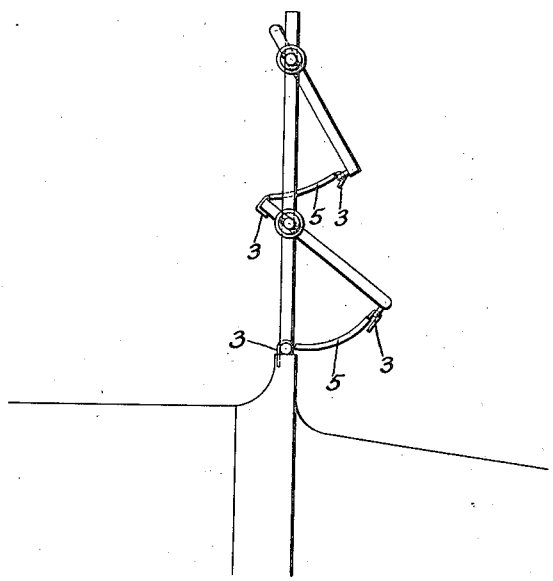
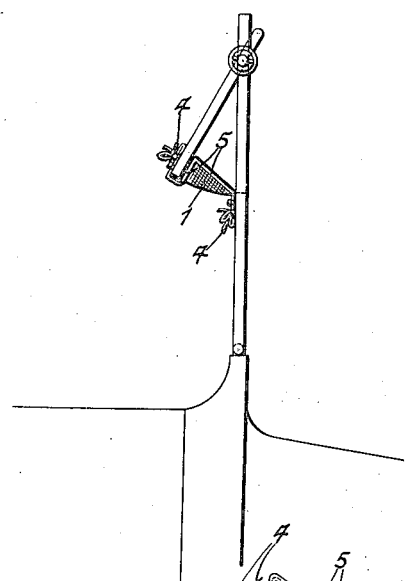
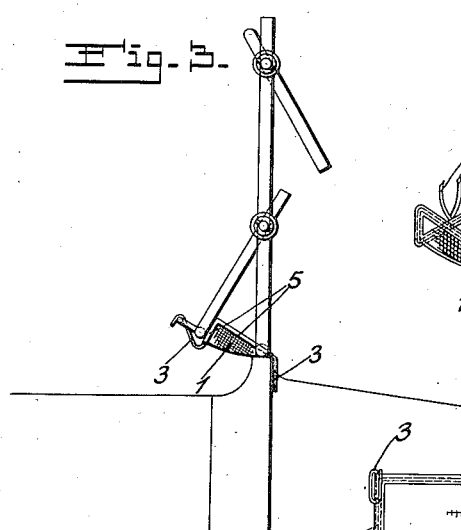
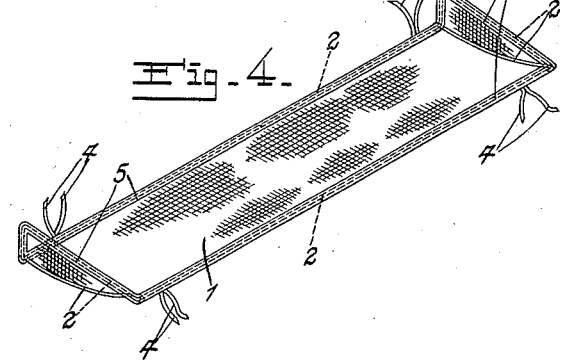
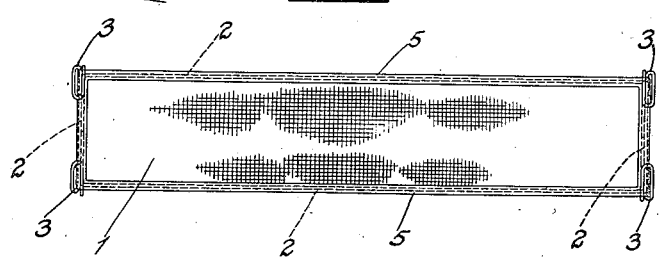
Inventor:
Horn G. Donigan,
by Rippey Kingsland
His Attorneys.

Patented Feb. 12, 1924.

1,483,652

UNITED STATES PATENT OFFICE.

HORN G. DONIGAN, OF ST. LOUIS, MISSOURI.

SCREEN FOR WINDSHIELDS.

Application filed August 29, 1921. Serial No. 496,309.

*To all whom it may concern:*

Be it known that I, HORN G. DONIGAN, a citizen of the United States, residing at the city of St. Louis and State of Missouri, have invented a new and useful Screen for Windshields, of which the following is a specification.

This invention relates to screens for windshields, and consists in the novel construction hereinafter disclosed.

An object of the invention is to provide a detachable screen adapted to be connected with adjacent edges of the panels of a windshield or the edge of a panel and the top of the cowl of the automobile to screen the openings when the windshield is in ventilating adjustment.

Additional advantages of the construction will be apparent from the following detailed description, taken in connection with the accompanying drawing in which several adaptations of the invention are shown, and in which, Fig. 1 is a view of one type of windshield showing the screen attached in operative position.

Fig. 2 is a view of another type of ventilating windshield, showing the screen in position.

Fig. 3 is an additional type of windshield and screen shown in position.

Fig. 4 is a detached view of one form of the screen.

Fig. 5 is a plan view of a type of screen.

The invention consists primarily in providing a flexible screen section 1 mounted on a frame 2, said frame 2 being preferably made of spring wire or similar material. In the form shown in Fig. 4 the ends of the screen are upturned over the ends of the frame so as to provide a vertical screen wall at the outer edges of the horizontal screen section, said vertical walls constituting additional protection against the entrance of foreign matter in the space intermediate the open panels of the windshield.

Various forms of devices for attaching the screen in place may be provided, the attaching members being in the form of hooks 3 or of tie-tapes 4. It is preferable to form a marginal edge 5 for the screen of felt or other similar material so that the screen will not injure the finish on the parts of the windshield or other parts of the automobile with which it comes in contact.

By reference to Fig. 1, which is an illustration of a double panelled windshield, the panels of which are outwardly opened in ventilating position, it will be noted that the screens are attached by means of the hooks 3 to handles formed on the bottom edge of each of the windshield panels and at the other end connected, respectively, over the edge of the lower panel and over the lower frame member of the windshield.

In Fig. 2 is illustrated an inwardly opening upper panel, in which case the screen is attached to the upper edge of the lower panel and engaged over the lower edge of the upper panel, being tied in place, thereby securing the screen in proper adjustment.

In Fig. 3 the screen is shown applied to an inwardly opening lower panel of the windshield, the inner hook engaging with the handles formed on the frame of the windshield and the outer hooks engaging over the edge of the lower frame member of the windshield.

Inasmuch as the material out of which the screen section is formed is flexible and likewise the frame member on which the screen member is mounted is flexible, the panels of the windshield may be closed without removing the screen. The screen is of a sufficiently fine mesh so as to prevent the entrance of insects or large particles of foreign matter, thereby protecting the driver when the machine is in motion.

I am aware that further modifications than those shown may be employed without departing from the spirit and scope of the invention.

I do not restrict myself, therefore, to the exact construction claimed and described, but what I claim and desire to secure by Letters Patent is:—

As an article of manufacture, a collapsible and extendable screen for automobile windshields comprising a reticulated screen having upturned ends, a flexible frame enclosing the edges of said screen, and means for detachably securing the frame between the adjacent edges of two panels of a ventilating windshield or between the panel and the frame of the windshield in any one of various ventilating positions of the windshield.

HORN G. DONIGAN.